(No Model.)
D. LIPPY.
CAR COUPLING.
No. 495,160. Patented Apr. 11, 1893.
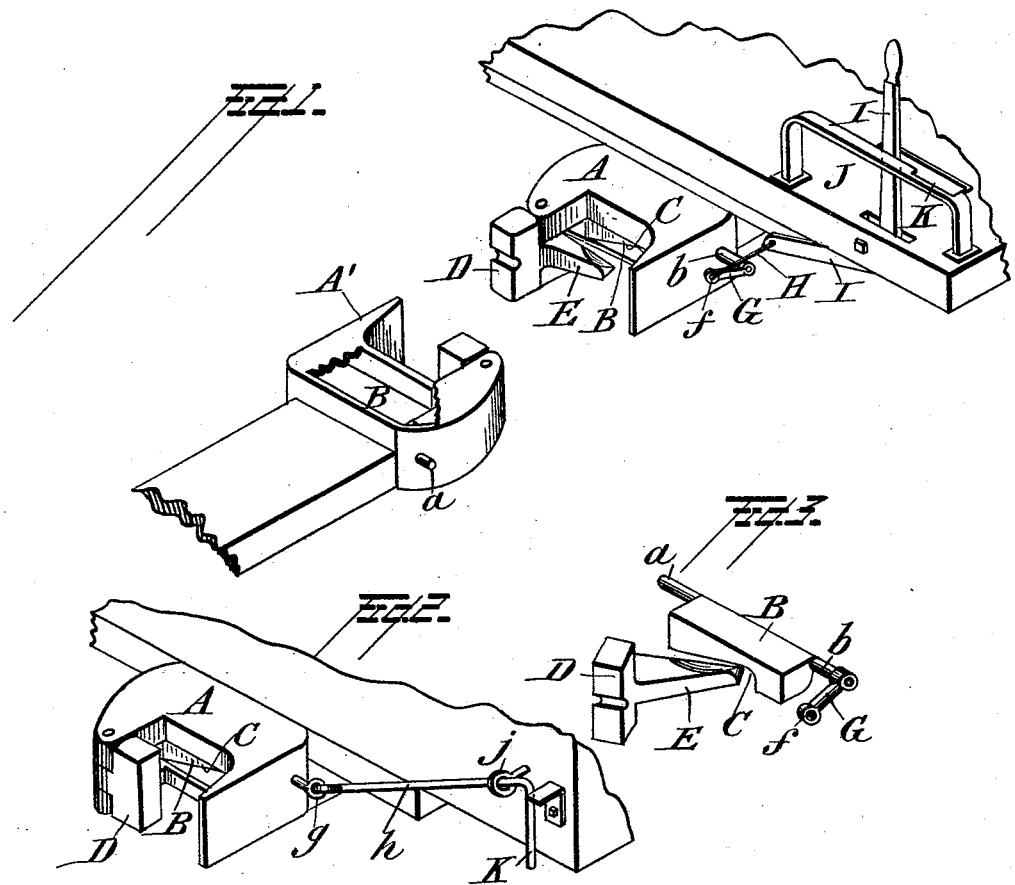
Attest:
F. H. Schott
C. Calvert Hulls
Inventor:
David Lippy
by his Attorneys
Mason, Fenwick & Lawrence

UNITED STATES PATENT OFFICE.

DAVID LIPPY, OF MANSFIELD, ASSIGNOR OF ONE-HALF TO DANIEL L. SPOTTS, OF CANTON, OHIO.

CAR-COUPLING.

SPECIFICATION forming part of Letters Patent No. 495,160, dated April 11, 1893.

Application filed November 1, 1892. Serial No. 450,653. (No model.)

*To all whom it may concern:*

Be it known that I, DAVID LIPPY, a citizen of the United States, residing at Mansfield, in the county of Richland and State of Ohio, have invented certain new and useful Improvements in Car-Couplings; and I do hereby declare the following to be a full, clear, and exact description of the invention, such as will enable others skilled in the art to which it appertains to make and use the same.

My invention relates to certain new and useful improvements in car couplings adapted for use upon either passenger or freight cars, and the objects of my said invention are, first, to provide a means whereby cars can be readily coupled or uncoupled automatically, or so arranged that they will not couple, at the will of the operator; and, second, to provide a cheap, durable and efficient means for the purposes stated.

In the accompanying drawings, Figure 1 is a perspective view of my improved car coupling attached to a portion of a passenger car, and a perspective view of a similar coupling detached and in a position ready for engagement with the attached coupling, the top portion of the latter coupling being broken away to show the chambered drawhead. Fig. 2 is a perspective view of a portion of a freight car with my coupling attached thereto. Fig. 3 is a perspective view of a combined locking head and lever arm and pivoted locking bar.

A in the drawings represents a drawhead which may be of any suitable construction, though the construction shown is deemed preferable. The upper portion of the drawhead is hollowed or chambered out to allow of the raising of a pivoted locking bar B placed within the said drawhead and pivoted at each end by suitable pivot-pins *a* and *b*, said locking bar being constructed with a rounded or curved recess *c* upon its under side.

D is a locking head pivoted in the drawhead and constructed with a lever arm E, the said lever arm being beveled or rounded off toward its rear edge to permit of its passage into the recess C in the locking bar for the purpose of raising the same.

G indicates a lever secured upon one end of the pivot *b*, forming part of the locking bar, the outer end *f* of the pivot *b* being formed with an eye for receiving the end of a link or rod H connecting the levers H and I. A hand lever I is pivoted in the platform J. By means of this hand lever and its connections the locking bar may be raised to permit the uncoupling of cars when desired. If it is desired to prevent the cars coupling during the operation of switching or for any other purpose, the lever I is placed within the catch-notch K, thereby preventing the locking bar from returning to its normal position and preventing the locking of the lever arm. In Fig. 1, I have shown the upper plate of the drawhead broken away for the purpose of showing the chamber formed in its top. In Fig. 2 I have shown an end portion of a freight car having my improved coupling attached thereto. When the coupling is used on such cars, instead of using the lever G shown in Fig. 1 upon the end of the pivoted locking bar, the end of said bar is formed with an eye *g*, and in this eye the bar *h* is linked or otherwise suitably connected, the said bar passing through an eye-bolt *j* secured to the end of the car. This bar is bent downwardly just beyond the point where it passes through the eye-bolt, forming a hand lever K, and by raising this lever upwardly the motion tilts the locking bar B, allowing the lever arm C to pass out.

The operation is substantially as follows: As the lever arm is swung backward when the locking head is being closed, the end of the lever arm is caused to pass into the opening *c* formed in the lower edge of the locking bar B, and by a continued backward movement of the lever arm the front edge of the pivoted locking bar is raised until it is high enough to permit of the lever arm passing beneath it into the recess behind the end of the locking bar. The greater portion of the weight of the locking bar being in the front and being unsupported after the passage of the lever arm, the bar returns to its normal position and locks the lever-arm.

What I claim as my invention is—

In a car coupling, in combination, a chambered drawhead, a combined lockinghead and lever arm pivoted in said drawhead, a locking bar having a rod secured to it at its rear, a lever G secured to the said rod by means of an eye portion formed upon one end and the other end having a similar eye portion for receiving one end of a link or rod connection, the other end of said connection being attached to a lever secured to a car, substantially as described.

In testimony whereof I affix my signature in the presence of two witnesses.

DAVID LIPPY.

Witnesses:
T. R. ROBINSON,
GEO. W. STATLER.